(12) United States Patent
Shida

(10) Patent No.: US 6,441,929 B1
(45) Date of Patent: Aug. 27, 2002

(54) IMAGE READING APPARATUS

(75) Inventor: Toshio Shida, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/263,300

(22) Filed: Mar. 5, 1999

(30) Foreign Application Priority Data

Mar. 13, 1998 (JP) ............................................. 10-062947

(51) Int. Cl.[7] ................................................ H04N 1/04
(52) U.S. Cl. ....................................... 358/488; 358/498
(58) Field of Search ................................. 358/488, 497, 358/498, 296, 474

(56) References Cited

U.S. PATENT DOCUMENTS

| | | | | |
|---|---|---|---|---|
| 4,165,069 A | * | 8/1979 | Colglazier | 271/162 |
| 4,418,903 A | * | 12/1983 | Landa | 271/10 |
| 4,939,554 A | * | 7/1990 | Hirabayashi | 355/317 |
| 5,475,504 A | * | 12/1995 | Ogura | 358/474 |
| 5,953,553 A | * | 9/1999 | Eto | 399/17 |

* cited by examiner

Primary Examiner—Jerome Grant, II
(74) Attorney, Agent, or Firm—Bierman, Muserlian and Lucas

(57) ABSTRACT

An image reading apparatus having an original conveyance apparatus for conveying an original to a reading position, includes: a first mounting member for coupling the original conveyance apparatus to the image reading apparatus so that the original conveyance apparatus is displaceable with respect to the image reading apparatus substantially in a direction perpendicular to a conveyance direction of the original; a second mounting member for coupling the original conveyance apparatus to the image reading apparatus so that the second mounting member serves as a rotation axis when the original conveyance apparatus is displaced in the direction perpendicular to the conveyance direction; and a fixing member for fixing the original conveying member to the image reading apparatus after the original conveyance apparatus has been displaced with respect to the image reading apparatus with the second mounting member serving as the rotation axis.

11 Claims, 4 Drawing Sheets

IMAGE READING APPARATUS

BACKGROUND OF THE INVENTION

The present invention relates to an image reading apparatus called a scanner which is incorporated in a copying machine, a facsimile machine and others to be used.

In many cases, an image reading apparatus has been composed of an image reading apparatus main body provided thereon with a sensor such as CCD which reads images on an original and an original conveyance apparatus conveying an original to a reading position, both of which are formed as separate units so that the original conveyance apparatus is mounted on the image reading apparatus main body. Under the aforesaid condition, two positioning pins have been provided on the image reading apparatus main body, and holes corresponding to these positioning pins have been provided on the original conveyance apparatus so that the original conveyance apparatus may be positioned on the image reading apparatus by making the positioning pins to fit in the holes on the original conveyance apparatus. Then, the original conveyance apparatus thus positioned has been fixed to that position by means of screws.

However, in the conventional method for positioning and fixing the original conveyance apparatus stated above, an error in positioning of the original conveyance apparatus has been caused by an error and improper fitting conditions of parts used for mounting the original conveyance apparatus on the image reading apparatus, and thereby a phenomenon which is not preferable for image reading has been caused. This phenomenon will be explained as follows, referring to FIGS. 1 and 2.

In the image reading apparatus wherein the original conveyance apparatus which conveys original OR to the exposure position is formed as a unit for the original conveyance apparatus main body on which line sensor SE that reads images of the original to be mounted thereon, when an angle for positioning the original conveyance apparatus on the image reading apparatus is deviated, the line sensor SE is arranged to be oblique to the original OR by deviation angle a from the direction perpendicular to the conveyance direction for the original as shown in FIG. 1, and moves relatively in the arrowed direction X for scanning.

As a result of the scanning, a rectangle on the original having longitudinal sides V and lateral sides H is read as an image deformed to be a parallelogram having oblique sides $V_1$ inclined from the longitudinal side V by inclination angle a and lateral sides H and $H_1$ (incidentally, the deviation angle a is shown to be greater than an actual angle).

As measures for the phenomenon stated above, there have so far been taken steps while watching inclination of the image reproduced through image reading, wherein each of screws at two points where the original conveyance apparatus is fixed on the image reading apparatus is loosened, and the position of the original conveyance apparatus is adjusted at each of the two points so that the original conveyance apparatus may be mounted and fixed again.

In this method of mounting an original conveyance apparatus, however, there have been caused difficulties in the steps to adjust the position of the original conveyance apparatus on the image reading apparatus main body and to establish the position, resulting in problems of time-consuming works.

A type of the image reading apparatus includes an apparatus of an optical system movement exposure type wherein an optical system reads images on an original stationary at an image reading position while the optical system is moving, and an apparatus of an original movement exposure type wherein images on an original moving on the image reading position are read by a fixed optical system.

In the case of the apparatus of a scanning exposure type, when the original conveyance apparatus is mounted with a deviated angle on the image reading apparatus incorrectly in terms of a mounting angle, an image to be outputted appears to be an inclined image. In the case of an apparatus wherein an original is stopped when its end portion hits a stopper plate, it is naturally possible to correct the inclination of the original to a certain degree by adjusting an amount of the hitting, which, however, requires the correcting means.

In the case of the apparatus of a synchronization exposure type, when the original conveyance apparatus is mounted with a deviated angle on the image reading apparatus incorrectly in terms of a mounting angle, an image to be outputted has an inclination angle agreeing with the deviated angle and is deformed to be a parallelogram whose side in the main scanning direction is longer than an actual side. Namely, a distorted image is outputted. The distortion of this image is not only a visual problem but also a serious problem in outputting drawings. In addition, it is not possible to adjust an amount of the hitting, which is different from the apparatus of the optical system movement exposure type.

Therefore, the invention can be applied to an apparatus of any type, and it is especially effective for the apparatus of the original movement exposure type.

Therefore, an object of the invention is to solve the problems mentioned above and to provide an image reading apparatus having the mounting structure with which an original conveyance apparatus can be mounted on an image reading apparatus main body easily.

SUMMARY OF THE INVENTION

The object of the invention stated above can be attained by an image reading apparatus having an original conveyance apparatus for conveying an original, including: a first mounting member for coupling the original conveyance apparatus to the image reading apparatus so that the original conveyance apparatus is displaceable with respect to the image reading apparatus substantially in a direction perpendicular to a conveyance direction of the original; a second mounting member for coupling the original conveyance apparatus to the image reading apparatus so that the second mounting member serves as a rotation axis when the original conveyance apparatus is displaced in the direction perpendicular to the conveyance direction; and a fixing member for fixing the original conveying member to the image reading apparatus after the original conveyance apparatus has been displaced with respect to the image reading apparatus with the second mounting member serving as the rotation axis.

Further, the object of the invention can be attained as a preferable structure by an image reading apparatus having therein an original conveyance apparatus conveying an original to the reading position and a reading means that reads images of an original under conveyance at the aforesaid reading position, the original conveyance apparatus being formed as a unit separate from the image reading apparatus main body having thereon the reading means and being mounted on the image reading apparatus main body, wherein a first mounting section is provided on one end portion of one side of the original conveyance apparatus and a second mounting section is provided on the other end portion, and the original conveyance apparatus is mounted on the image reading apparatus in a way that the original conveyance apparatus is moved relatively to the image reading apparatus by the first mounting section and the original conveyance apparatus is rotated relatively to the image reading apparatus by the second mounting section, and there is provided a fixing means which fixes the original conveyance apparatus at the position to which the original conveyance apparatus is moved by the first mounting section.

DETAILED DESCRIPTION OF THE PREFERRED EMBODIMENT

Figure 4:
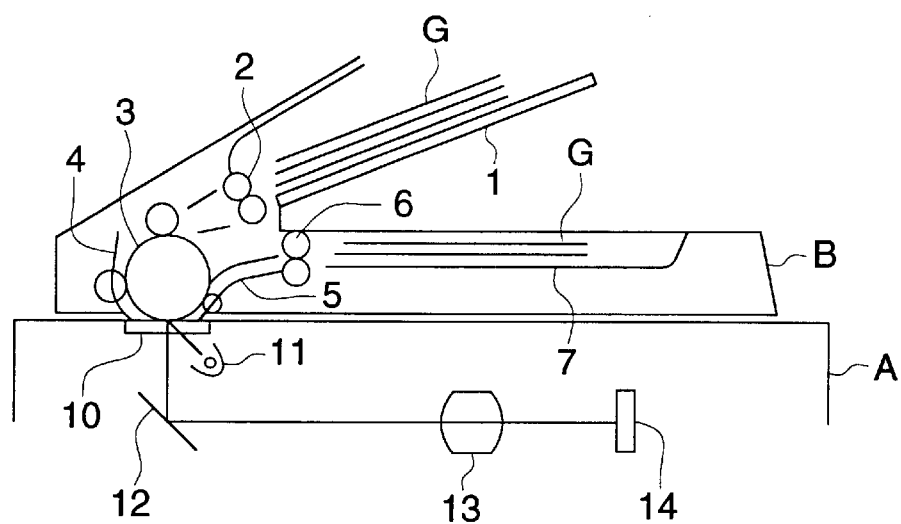
FIG. 4 is a plan view of the digital copying machine shown in FIG. 3.
Figure 3:
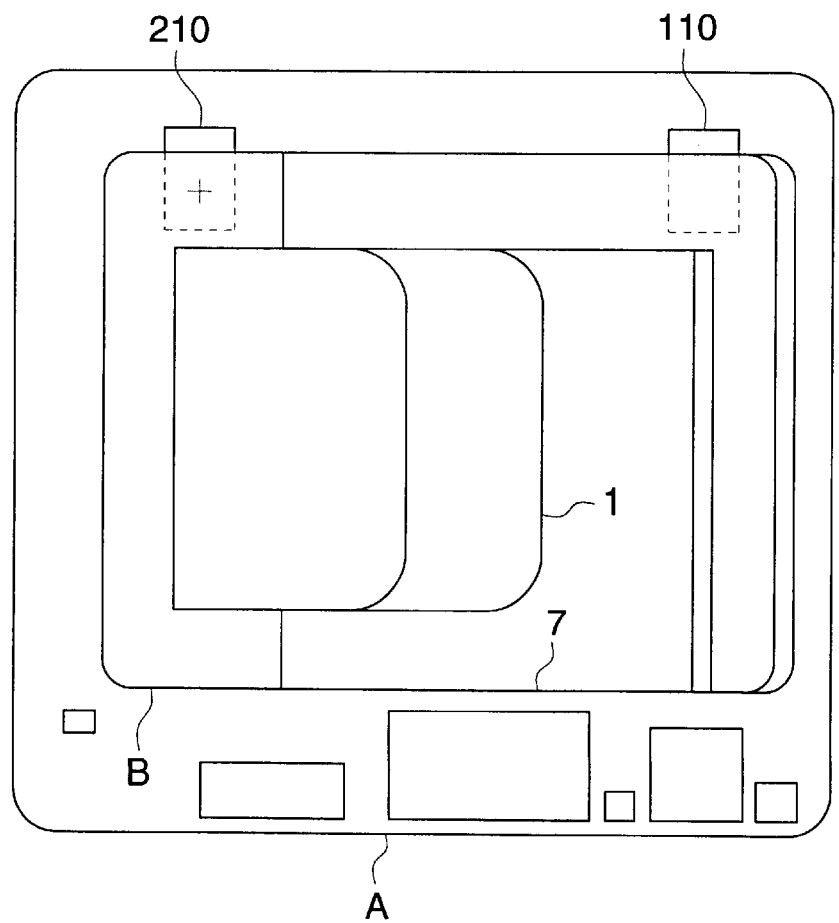
FIG. 3 is a sectional view of an image reading section of a digital copying machine in which an embodiment of the invention is incorporated.

Each of FIGS. 3 and 4 shows a digital copying machine in which an embodiment of the invention is incorporated, and FIG. 3 is a sectional view of an image reading section of the digital copying machine, and FIG. 4 shows its plan view.

A copying machine is composed of copying machine main body A having thereon image sensor 14 constituting CCD and of original conveyance apparatus B. The original conveyance apparatus B is composed of sheet-feeding tray 1 on which a large number of originals G are stacked, sheet-feeding rollers 2 which separate a sheet of original from the sheet-feeding tray 1, reversing roller 3 which conveys original G to make it pass through the reading position and sheet-exit rollers 6 which ejects the original having passed the reading position to sheet-exit tray 7. Guide members 4 and 5 each being composed of a roller and a guide plate are provided before and behind the reading position for the purpose of conveying the original along the reversing roller 3.

On the copying machine main body A, there are provided light-transmitting plate 10 which is composed of glass that forms the reading position together with the reversing roller 3, original-illuminating lamp 11, reflecting mirror 12, lens 13 and image sensor 14 structured with line CCD.

Originals G on the sheet-feeding tray 1 are conveyed by the sheet-feeding rollers 2 one sheet by one sheet, then pass through the reversing roller 3 and are ejected on the sheet-exit tray 7 by the sheet-exit rollers 6. Images of the original G are illuminated by the original-illuminating lamp 11 through the light-transmitting plate 10. Light of the images advances through the reflecting mirror 12 and lens 13 and is formed as an image on the image sensor 14 to be read by the image sensor 14.

Figure 1:
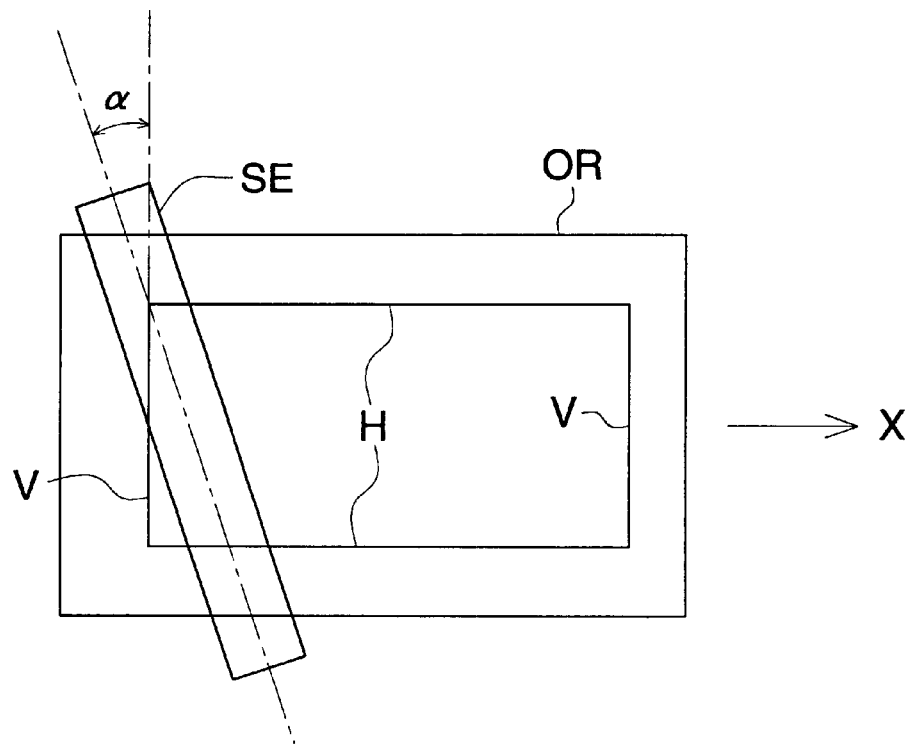
FIG. 1 is a diagram illustrating the state of scanning by means of an image sensor for images on an original.
Figure 2:
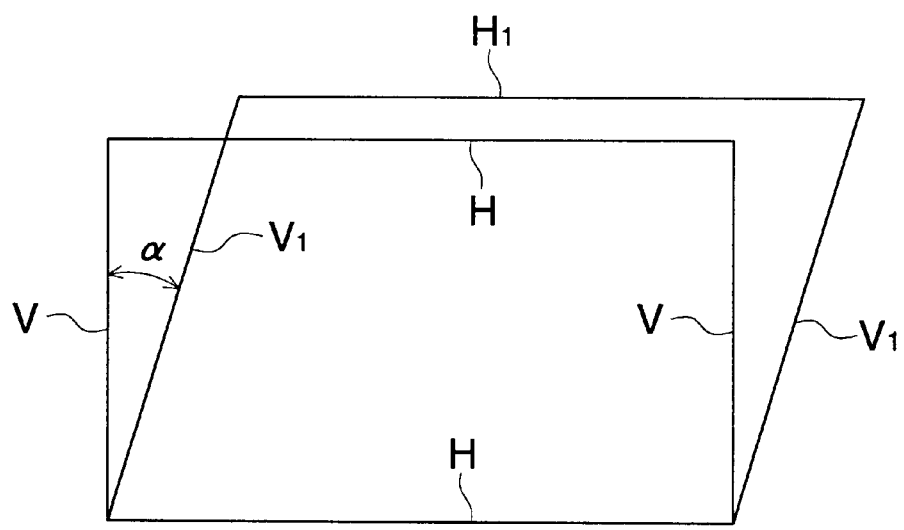
FIG. 2 is a diagram illustrating distortion of images caused by inclination of an original conveyance apparatus.
Figure 5:
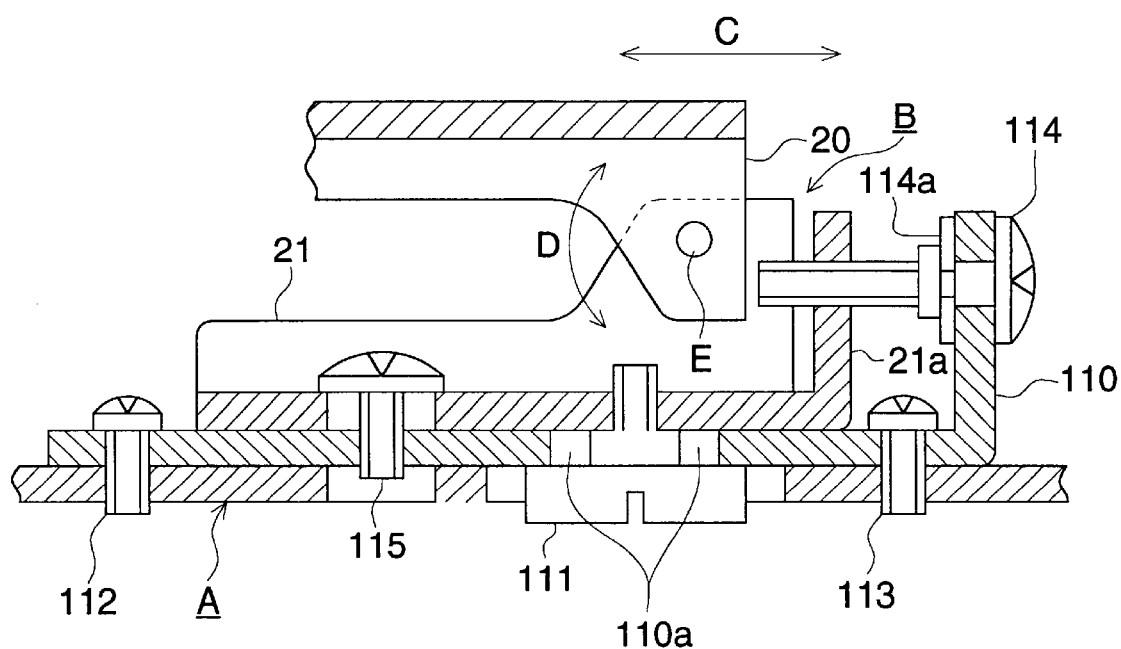
FIG. 5 is a sectional view of a first mounting section in the embodiment of the invention.
Figure 6:
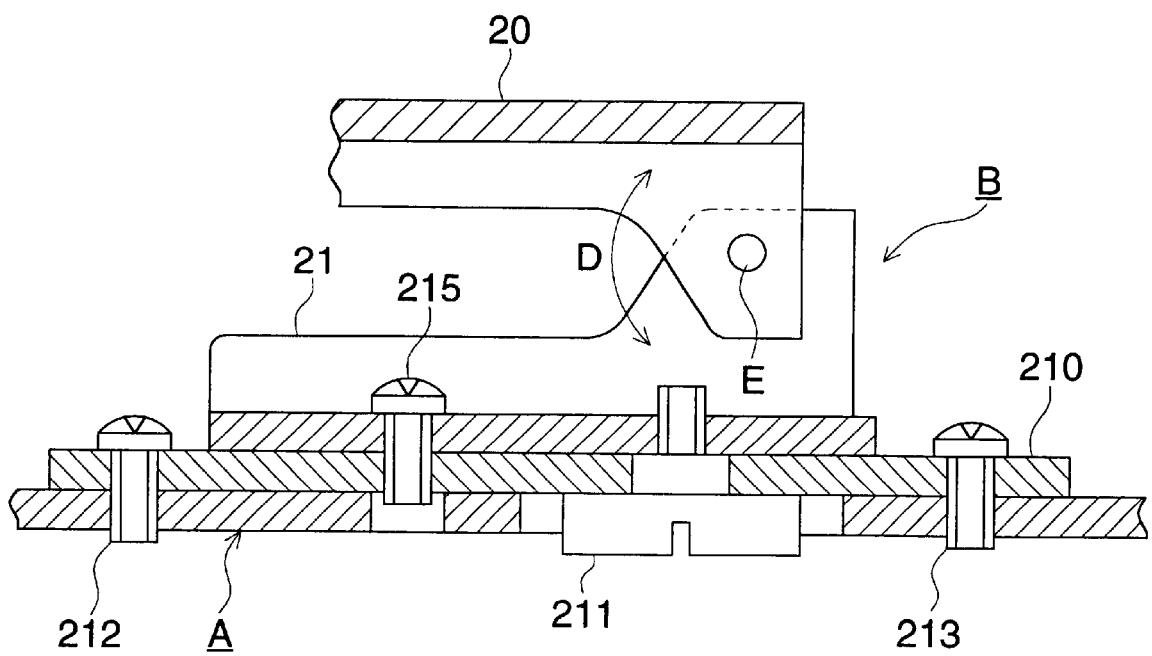
FIG. 6 is a sectional view of a second mounting section in the embodiment of the invention.

The original conveyance apparatus B is combined with the copying machine main body A through combination members 110 and 210 located on the upper side in FIG. 4. As shown in FIGS. 5 and 6, the original conveyance apparatus B is composed of fixed portion 21 which is fixed on the copying machine main body A and of movable portion 20. The movable portion 20 has a primary portion of the original conveyance apparatus shown in FIG. 1, and is rotatable on shaft E (shown in FIGS. 5 and 6) located at the upper side in FIG. 4 as shown with arrow D in FIGS. 5 and 6, and this rotation makes the reading position to be exposed.

The fixed portion 21 is a part of the original conveyance apparatus B, and that part combines the movable portion 20 with copying machine main body A and is fixed on the copying machine main body A through combination members 110 and 210.

The copying machine main body A and the combination member 110 are combined with screws 112 and 113. The combination member 110 and the fixed portion 21 are combined with stepped screw 111 and screw 115. A hole formed on the combination member 110 through which the stepped screw 111 passes is formed so that clearance 110a may be formed between the hole and the stepped screw 111. Adjusting screw 114 is a screw which is screwed in the combination member 110 with E-ring 114a serving as an in-between, and it is a moving means which is screwed in erected portion 21a of the fixed portion 21 to move the fixed portion 21 by rotating as shown with arrow C.

The copying machine main body A and the combination member 210 are combined with screws 212 and 213. The fixed portion 21 is combined with combination member 210 with stepped screw 211 and screw 215. A clearance like one formed between the stepped screw 111 and the combination member 110 is not formed between the stepped screw 211 and the combination member 210. Namely, the fixed portion 21 can rotate on the axis of the stepped screw 211 relatively to the combination member 210, but it can not make any displacement. Incidentally, a hole on the fixed portion 21 in which the screw 215 fits is formed to be an elongated hole having a dimensional room in the direction perpendicular to the paper in FIG. 6 so that the fixed portion 21 may rotate on the axis of the stepped screw 211. Incidentally, because of the relation with a position of the center of gravity of the original conveyance apparatus B, the stepped screws 111 and 211 are highly loaded. Therefore, stepped screws which are highly resistant to load are used as the stepped screws 111 and 211. In addition, the stepped screw 211 serving as the rotational center is located to be closer to light-transmitting plate 10 representing the reading position in the course of original movement exposure than the stepped screw The original conveyance apparatus B is mounted on the copying machine main body A through the following procedures.

First of all, the original conveyance apparatus B is positioned roughly on the copying machine main body A in accordance with the conventional mounting method, and the copying machine main body A, the original conveyance apparatus B and combination members 110 and 210 are combined. Then, the combination members 110 and 210 are fixed on the copying machine main body A by tightening screws 112, 113, 212 and 213.

Next, image reading and image reproduction are conducted, and distortion of a reproduced image is measured. Reproduction of images may either be one on a hard copy, or be one on a monitor.

After screws 115 and 215 are loosened in accordance with an extent of the measured distortion, the original conveyance apparatus B is rotated on the axis of the stepped screw 211 by rotating the screw 114, and its angle is adjusted. After completion of adjustment of the angle, screws 115 and 215 are tightened to fix the fixed portion 21 respectively on combination members 110 and 215.

Since an angle formed between the original conveyance apparatus B and the copying machine main body A is adjusted through adjustment work by screw 114 on only one location, the adjustment is simple and easy and fine adjustment can further be conducted, which makes accurate adjustment possible through adjustment in a short period of time.

An angle formed between an original conveyance apparatus and an image reading apparatus can be adjusted simply and easily in the image reading apparatus, and man-hour and time for assembly, adjustment and repair of the image reading apparatus can be shortened.

What is claimed is:

1. An image reading apparatus having an original conveyance apparatus for conveying an original, comprising:

(a) a first mounting member for coupling the original conveyance apparatus to the image reading apparatus so that the original conveyance apparatus is displaceable with respect to the image reading apparatus substantially in a horizontal direction which is perpendicular to a conveyance direction of the original;

(b) a second mounting member for coupling the original conveyance apparatus to the image reading apparatus so that the second mounting member serves as a rotation axis of the original conveyance apparatus when the original conveyance apparatus is displaced in the horizontal direction while being maintained in the same horizontal plane; and (c) a fixing member for fixing the original conveyance apparatus to the image reading apparatus after the original conveyance apparatus has been displaced with respect to the image reading apparatus with the second mounting member serving as the rotation axis, wherein said original conveyance apparatus is mounted on top of said image forming apparatus.

2. The image reading apparatus of claim 1, wherein the first mounting member comprises:

a first combination member provided between the original conveyance apparatus and the image reading apparatus; and a first connecting member for connecting the original conveyance apparatus to the first combination member, wherein the first combination member has a hole through which the first connecting member passes, and the hole has a gap in which the first connecting member can be displaced with respect to the image reading apparatus in the horizontal direction, and wherein the first combination member is fixed on the image forming apparatus.

3. The image reading apparatus of claim 2, wherein the first connecting member is a stepped screw.

4. The image reading apparatus of claim 1, wherein the second mounting member comprises:

a second combination member provided between the original conveyance apparatus and the image reading apparatus; and a second connecting member for connecting the original apparatus to the second combination member so that the original apparatus can be rotated in a horizontal direction with respect to the image reading apparatus, and wherein the second combination member is fixed on the image forming apparatus.

5. The image reading apparatus of claim 4, wherein the second connecting member is a stepped screw.

6. The image reading apparatus of claim 1, wherein the first mounting member further comprises a displacement member for displacing the original conveyance apparatus in the horizontal direction with respect to the image reading apparatus.

7. The image reading apparatus of claim 6, wherein the displacement member is an adjusting screw.

8. The image reading apparatus of claim 7, wherein the first mounting member comprises:

a first combination member provided between the original conveyance apparatus and the image reading apparatus, wherein the adjusting screw is rotatably coupled to the first combination member, and screwed onto the original conveyance apparatus.

9. The image reading apparatus of claim 1, wherein the original conveyance apparatus is rotatably provided to the image reading apparatus about one side of the original conveyance apparatus to which the first and second mounting members are mounted, as an axis, and thereby an image reading position of the image reading apparatus can be exposed.

10. The image reading apparatus of claim 1 further comprising:

an image reading position at which an image of the original is read while being conveyed by the original conveyance apparatus.

11. The image reading apparatus of claim 10, wherein the second mounting member is provided on a position closer to the image reading position than the first mounting member.

* * * * *